United States Patent [19]

Fleck, Sr. et al.

[11] Patent Number: 5,408,874
[45] Date of Patent: Apr. 25, 1995

[54] LOCATION OF FLUID BOUNDARY INTERFACES FOR FLUID LEVEL MEASUREMENT

[75] Inventors: Charles J. Fleck, Sr., National Park, N.J.; Charles J. Fleck, Jr., Bristol, Pa.

[73] Assignee: The United States of America as represented by the Secretary of the Navy, Washington, D.C.

[21] Appl. No.: 128,409

[22] Filed: Sep. 30, 1993

[51] Int. Cl.⁶ .................. G01F 23/28; G01F 23/30
[52] U.S. Cl. .................................. 73/290 V; 367/908
[58] Field of Search ............. 73/290 V; 340/621; 367/908

[56] References Cited

U.S. PATENT DOCUMENTS 5,036,703  8/1991  Eriksson ...................... 73/290 V
5,184,510  2/1993  Rossman ..................... 73/290 V

FOREIGN PATENT DOCUMENTS 2408772  9/1975  Germany ..................... 73/290 V Primary Examiner—William A. Cuchlinski, Jr.
Assistant Examiner—Willie Morris Worth
Attorney, Agent, or Firm—Charles D. Miller

[57] ABSTRACT

A technique and sensor is provided for directly measuring the thickness of layers of immiscible liquids of differing densities and other materials contained in a tank or other container, preferably by reflection of ultrasonic energy. A preferred form of float comprises a container filled with material sampled from the tank and includes a reflector of ultrasonic energy of greater density, whereby the reflector is accurately positioned at an interface between two immiscible liquids of differing densities. The float is restrained close to the axis of energy radiation of the ultrasonic transducer by either a tube, forming a housing or a flexible cord. If a tube is employed, a slit in a lateral side thereof allows the tube to act as a baffle and reduce the effects of fluid motion within the tank on the measurement being made.

9 Claims, 2 Drawing Sheets

LOCATION OF FLUID BOUNDARY INTERFACES FOR FLUID LEVEL MEASUREMENT

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

The present invention generally relates to liquid level measurement and, more particularly, to the measurement of the quantities of immiscible materials contained within a tank or container.

2. Description of the Prior Art

The measurement of fluids within substantially closed containers has found applications in many fields of endeavor such as fuel level sensing in automobiles and other vehicles. Accordingly, it has long been recognized that the presence of significant amounts of contaminant substances can affect the accuracy of determinations of volume of a fluid from liquid level measurements. In particular, contamination of petroleum-based fuels with water has been a commonly encountered difficulty since fuel tanks must be vented to allow replacement of volumes of fuel withdrawn from a tank with the ambient atmosphere in order to avoid developing a partial vacuum in the tank. The ambient atmosphere may be relatively humid, particularly on water-borne vehicles and the temperature differential between the ambient atmosphere and fuel or the fuel tanks (which will often approximate the water temperature) will cause the moisture in the ambient atmosphere to condense to liquid phase. Therefore, substantial quantities of liquid water may accumulate in fuel tanks over a relatively short period of time.

Since water has a greater specific gravity than most petroleum fuels, such as diesel fuel, water condensing in a fuel tank will generally collect at the bottom of a fuel tank and raise the level of the surface of the fuel in the tank. Since the passage of water into engines is extremely undesirable, numerous techniques have been developed for extracting fuel from a location within a fuel tank which is likely to be uncontaminated with water (e.g. within the volume of the fuel. Since fuels can also contain some other contaminants which would not be harmful if homogeneously distributed in the fuels as charged into a fuel tank, such as solid particles which may settle out of the fuels, any settling of such contaminants will not be collected with fuel as fuel is withdrawn from the tank. Therefore, over several fillings of a tank, a substantial accumulation of such particles, as sludge, may occur and further complicate determination of the volume of usable fuel present in a tank from the level of liquid present in the tank. Principally for this reason, the amount of usable fuel remaining in a tank cannot be adequately extrapolated from a measurement of the changed of level when fuel is charged into the tank and subsequent reductions in liquid levels as fuel is withdrawn.

Further, when it is determined that contaminants should be purged from a tank, it is helpful to be able to ascertain the relative amounts of water and settled solids in order to carry out contaminant removal. For example, when water is removed from the tank, it may be desirable to pass the water through an oil/water separator so that the water may be discharged without release of oil and the oil further processed for possible re-use or disposal. Removal of water from the tank by draining in the presence of excessive amounts of sludge may cause the sludge to mix with the water and could thus adversely affect the operation of such an oil/water separator. Therefore, the relative amounts of contaminants may be determinative of which of a plurality of types of remedial action should be undertaken.

An additional problem may be encountered in tanks carried by vehicles and water-borne vessels, in particular, since the motion of the vehicle may cause shifting of fluids in the tank. Complex wave-like action is often observed in large tanks, both at the liquid surface and at interfaces between immiscible fluids of differing densities. To date, there has been no technique of directly approximating the average fluid levels or location of fluid interfaces without the averaging of a plurality of samples taken over time. Such sampling is time-consuming and expensive since known techniques of measuring fluid interfaces such as oil/water interfaces often involve a single use dip-stick treated with materials which react differently (e.g. produce a color change) which is distinctive of contact with one of these materials. The determination may also be biased by fluid motion (e.g. detection of the highest fluid level during the finite time the dipstick is in place) or otherwise complicated by the removal of fluid from the tank during the period over which samples are taken. Further, for tanks installed in or carried by water-borne vessels, liquid level measurements may be biased by vessel trim.

In instances where fluid level measurement systems are permanently installed in a tank or container, it is most common to use a float on a pivoted arm in order to drive a conductive wiper across a resistive element. However, such arrangements are somewhat unreliable since they may leak or be damaged in a manner which changes the buoyancy of the float. This is especially true if it is attempted to use a float for detection of an interface between immiscible fluids where buoyancy of a float would be very critical due to low differential density of the fluids. Further, such pivoting arms inherently introduce non-linearities into the measurement which may be difficult to compensate. The measurement accuracy available from such mechanical arrangements and other known arrangements is not high due to the friction of the wiper contact with the resistive element and lost motion in the mechanical linkage (e.g. where the float is coupled to a transducer through a pivoted spiral shaft.

Such mechanisms are also sensitive to mounting location and angle and are not suitable for portable use. Further, where there is reason to avoid permanent installation of a fluid level sensor, access to the interior of the tank is likely to be restricted to the diameter of a fill or vent aperture and which may be as little as one inch in diameter. Access may also be restricted by nearby structures such that an elongated device, such as the previously mentioned dip-sticks may be inconvenient or impossible.

Additionally, for a portable liquid level measurement system, the size and geometry of the tank may present particular problems. For example, it may be necessary or desirable to use the same portable liquid level measurement device on tanks or containers of widely disparate sizes, particularly in vertical dimensions. Therefore, the particular sensor hardware may limit the applicability of a particular sensor structure to tanks or containers of particular dimensions. Accordingly in view of the low friction available from rotational bearings and joints, it is difficult to provide a single arrangement of sensor hardware which will accommodate a variety of container or tank dimensions as well as provide sufficiently high resolution in the vertical direction.

Many applications of so-called sonar techniques are also well-known in the art. Sonar techniques involve the generation, by a transducer, of a pulse of ultrasonic energy which may be partially reflected from any surface it encounters. If the propagation speed of the ultrasonic pulse through a medium, such as a fluid, is known or can be approximated, the distance of the surface from the transducer can be approximated. A substantial amount of information can also be derived concerning the nature of the surface from which it is reflected. In particular, in recent years, such systems have become popular equipment for use as depth finders and fish locators on boats and sophisticated graphics displays using display media such as cathode ray tubes or liquid crystal matrices have also been developed and are commercially available with such systems at relatively low cost. An example of such a system is available from APELCO Marine Electronics of 46 River Rd., Hudson, N.H., 0305109922 as Model No. XCD 250.

SUMMARY OF THE INVENTION

It is therefore an object of the present invention to provide a simple and reliable fluid level measurement system and method which can continuously and simultaneously monitor a liquid level and at least two material interfaces within a container.

It is another object of the present invention to provide a liquid level measurement system and method which is relatively unaffected by periodic fluid motion within a tank or container.

It is a further object of the present invention to provide a fluid level measurement system and method which is portable and may be used where access to the interior of a tank or container is extremely restricted.

In order to accomplish these and other objects of the invention, a sensor for determining the contents of a tank or other container is provided including a transducer for radiating energy along an axis in a substantially vertical direction through contents of the tank or other container, a buoyant float, attached to the transducer, for positioning the transducer at a gas-liquid interface, and a float having a density intermediate between the densities of two immiscible liquids which may be contained by the tank or container and including a reflector of ultrasonic energy, and an arrangement for restraining the float in approximate alignment with the axis of transducer.

In accordance with another aspect of the invention, a method is provided for determining contents of a tank or other container, including the step of buoyantly supporting an energy radiating and receiving transducer means at a gas-liquid interface and in a predetermined orientation such that an axis of energy radiation of said transducer means is substantially vertical.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figures 1, 2:
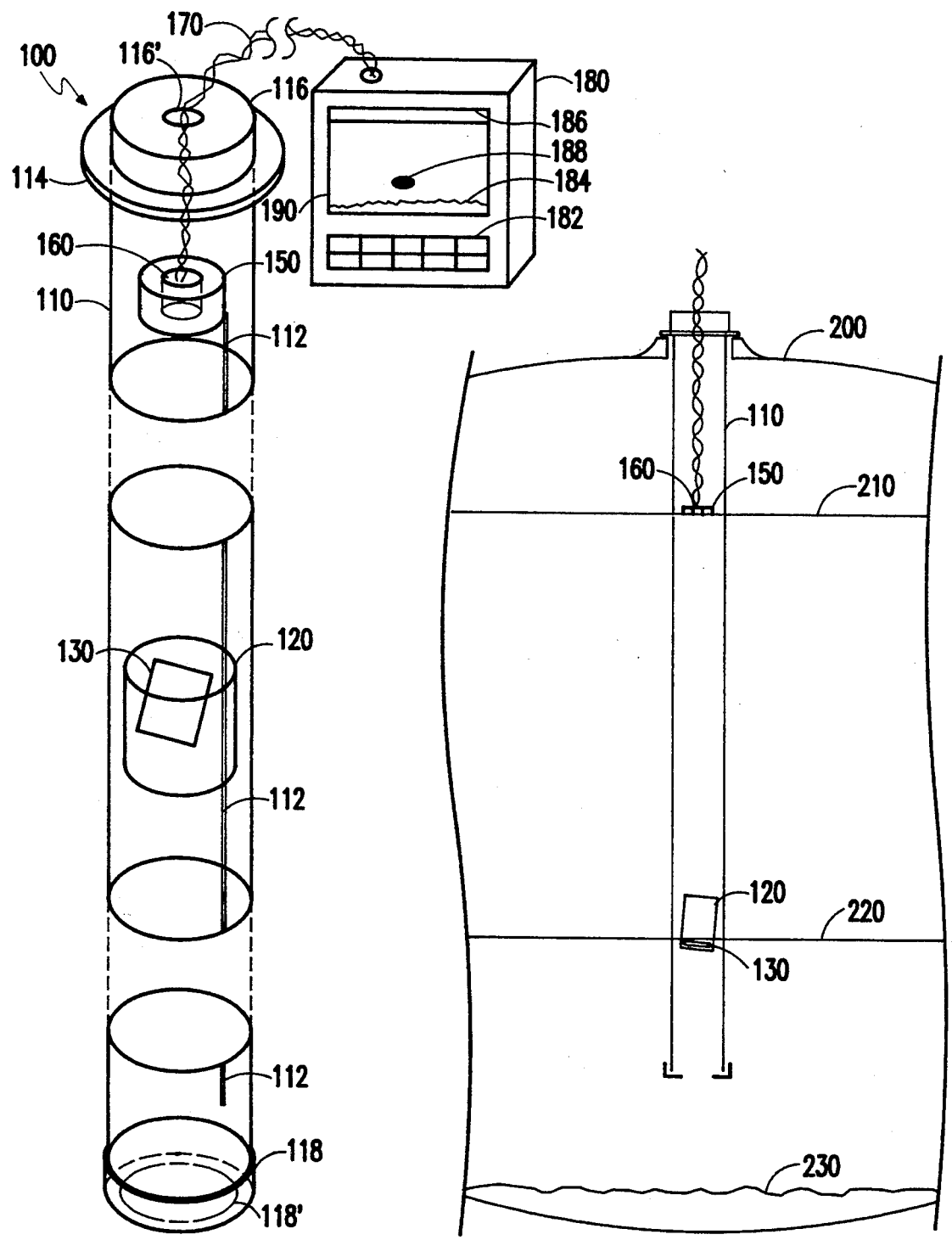
FIG. 1 is an isometric view of an embodiment of the invention suitable for permanent installation.
FIG. 2 is a view of the invention as installed in a tank or container holding arbitrary amounts of two immiscible liquids and sludge.

Referring now to the drawings, and more particularly to FIG. 1, there is shown, in isometric view, an embodiment of the invention suitable for semipermanent installation in, for example, a large fuel tank such as may be found on a seagoing vessel. As is typical for such vehicles, diesel engines are often the motive power source of choice due to the relative safety of diesel fuel and it will be assumed for convenience of discussion that the contents of the tank are intended to be diesel fuel. However, it is to be understood that the invention is applicable to any liquid which may be contained in any container including but not limited to natural or man-made bodies of water. For example, the invention could also be used to measure the depth extent of an immiscible pollutant, such as may be caused by a crude oil spill, to determine its distribution.

The embodiment 100 of FIG. 1 includes a housing tube 110 for loosely confining the remaining parts of the system so that they will remain in a cooperative relationship both before and after installation. The housing tube may be made of any material which is substantially inert to the fluids which may be placed in the tank. Polyvinyl chloride (PVC) materials are particularly suitable and suitable sizes of PVC tubing is readily available commercially as plumbing supplies. PVC may be readily worked with hand or power tools to form slit 112 and fittings to form flange 114 and end caps 116 and 118 are similarly available commercially. Transparent materials can also be used and may be advantageous to allow inspection of the parts enclosed by housing tube 110 without disassembly.

The cross-sectional shape of housing tube 110 is unimportant to the practice of the invention. The diameter may be made fairly small and still provide a clearance of at least about 10%-20% between the inside diameter and the parts of the system enclosed therein in order to prevent binding. The outside diameter should also be chosen in view of any opening in which the housing may be mounted. The housing tube 110 is preferably provided with a thin slit 112 over the central portion of the length thereof and preferably extending to within a few inches of the ends thereof. This slit allows any fluids in the tank to assume the same average levels within housing tube 110 but also allows housing tube 110 to serve as a baffle to substantially reduce the effects on liquid levels of liquid motion (e.g. waves) within the tank.

The body of the housing tube 110 is also provided with a mounting structure 114 for securing it to the tank. A flange is shown in FIG. 1 for this purpose which would perform the desired function of preventing the tube from falling into the tank during installation. However, many other arrangements would serve this function as well and will be evident to those skilled in the art in view of this disclosure, such as a threaded portion to match a threaded opening in the tank.

The upper end of the housing tube 110 is substantially closed with an apertured end cap 116. It is preferred that end cap 116 be removable from the housing tube to allow repair or replacement of a transducer 160 and a float 120 of alterable buoyancy, as will be discussed more fully below. Aperture 116' is preferably sized to prevent binding with a signal wire 170 which is passed therethrough and to restrain the transducer 160 and buoyancy device 150 to the interior of the housing tube. However, other closure arrangements can also be used, as necessary or desired, in view of the nature of the liquids stored in the tank. For example, a vapor collection system or a spark arresting structure could also be applied in addition to or substitution for aperture 116'.

Likewise an apertured cap 118 is provided at the lower end of housing tube 110. Opening 110 should be sized to restrain float 120 to the interior of the housing tube 110. Alternatively, the bottom of the housing tube may be bent inwardly for the same purpose or a screen-like covering could be provided. A screen may, in fact, be preferable and openings therein sized to prevent particles from entering housing tube 110 which are of a size which could cause binding of parts enclosed within the housing tube.

In order to measure the location of interfaces of fluids within a tank, a ultrasonic or sonar system is provided, including a transducer 160 and a control and display module 180. The control and display module contains electronic signal processing circuitry for energizing the transducer 160 to emit ultrasonic signals and to correlate sensed return signals with the emitted pulses and to generate a display on a display device 190, such as a CRT of liquid crystal matrix, which indicates the relative positions of surfaces from which the emitted pulse signals are reflected, preferably in a graphic form. The control and display module also preferably includes a user input arrangement such as keyboard 182 for adjustment and/or setting of operating parameters such as range and sensitivity. The specific arrangement for performing these functions are not important to the practice of the invention and commercially available depth finders such as the APELCO Model XCD 250 may be used, substantially as supplied from the manufacturer.

However, the transducer which is typically supplied with commercially available depth finder systems is larger than can be used with the invention but suitable transducers of reduced size are readily available commercially. The size of the transducer suitable for use with the present invention is limited because, in the preferred form of the invention, the transducer is fitted with a buoyancy device 150 such as a small annulus of polymer foam which is preferably coated to prevent flaking of the foam material or chemical attack on the foam by the fluids or vapors in the tank.

The formation of the buoyancy device 150 as an annulus around the transducer also stabilizes the orientation of the transducer for radiation of ultrasonic energy in a substantially vertical direction along the axis of the housing tube 110 and is preferred for that reason. Therefore the transducer 160 must be small enough that a buoyancy device 150 can be fitted thereto while leaving a sufficient clearance between the buoyancy device and the inner diameter of housing tube 110 to prevent binding. Those skilled in the art will be able to select an appropriate transducer from among commercially available transducers based upon the frequency to be radiated and received and the size which is tolerable for a given application.

The volume of this small annulus 150 should be sufficient to provide positive buoyancy to both the transducer and length of the wiring 170 connecting the transducer 160 to the control and display module 180 equal to ar least a substantial fraction of the vertical dimension of thee tank. Thus, the transducer is made to float at the gas-liquid interface of the contents of the tank for good coupling of the ultrasonic pulse signal to the liquid as shown in FIG. 2. This feature of the invention also provides a reference location on the display as depicted at simulated surface line 186.

To adapt the transducer 160 and the control and display module to particularly large tanks, it may be necessary to replace wiring link 170 with a link of increased length. Due to the high frequency (about 200 KHz for the APELCO XCD 250) of the signals carried by the wiring link, the length and impedance of the wiring link 170 may be somewhat critical to good performance of the system. Therefore, additional wiring should be of the same type and in integral multiples of the wavelength of the frequency at which the system operates (e.g. eleven feet for the APELCO XCD 250) or, alternatively, in integral multiples of the length of the wiring length supplied by the manufacturer.

To enable detection of the interface between immiscible liquids of differing densities within the tank, the invention preferably provides a float in the form of a small container 120, preferably of PVC or other plastic having a density not significantly differing from the density of the lower density liquid at each anticipated interface to be detected. By filling the container with the lower density liquid at each anticipated interface, the container will float on the higher density liquid at each interface. This is particularly convenient for detection of a single oil/water interface or the like since a small quantity of oil may simply be sampled from the tank to provide the correct buoyancy of the container. This arrangement also provides the advantage of resistance to the effects of damage and leakage of the float since neither is likely to cause a change in buoyancy of the float. Since the container floats above the higher density liquid little surface is presented for entry of the higher density liquid and, in any event, pressures are substantially equalized between the interior and exterior of the float 120. Further, the fluid within the float as well as the preferably resilient material of the container effectively resist virtually any change to the shape or volume of the container, such as by denting.

To enhance detection of interfaces using a container 120 as a float, a small piece 130 of incompressible, relatively high density material such as a metal (e.g. aluminum) foil is also placed within the container. The density of this material makes it a good reflector of the ultrasonic pulses and causes the material to sink to the bottom of the container. The density of the material also slightly decreases the buoyancy of the container (that is, giving the container an effective density intermediate between the densities of the immiscible liquids) and causes it to sink through the lower density liquid to the surface of the higher density liquid. Thus, the small piece of material 130 may be positioned very close to the interface to be detected in a very simple manner, as shown in FIG. 2.

It is to be understood that the formation of a plurality of solid pieces of material of differing densities could also be used, much in the manner employed in low-cost battery testers which measure specific gravity on an electrolyte within the scope of the present invention. However, the use of a container which can be filled with a fluid sampled from the tank and also enclose a readily detected piece of material 130 is preferred for the reasons discussed above. Referring now to FIG. 2, the invention is shown in place as installed in a typical tank 200 in which exemplary locations of a gas-liquid interface 210, an interface between two immiscible liquids of different density (e.g. oil and water) 220 and a sludge layer 230 are also indicated. The length of the housing tube 110 should be somewhat shorter than the full depth of the tank to avoid sludge interfering with the proper operation of the invention (e.g. by causing binding of float 120) and to avoid interference with the deposit of sludge so that information concerning the nature of the deposit may be discerned by the system and without interfering therewith. For example, if the lower end of the housing tube 110 were to be located below the surface of the sludge layer 230, the baffling provided by the housing tube may cause the sludge layer to be of reduced thickness within the housing tube and to settle more densely than in the remainder of the tank.

In operation, the invention thus provides a transducer which floats in a substantially fixed orientation on the gas-liquid interface 210 which then corresponds to simulated surface line 186 on display 190 of FIG. 1. The float 120 containing an ultrasonic reflector floats at the interface 220 between the liquids of differing density to provide image 188 on the display. It should be noted that the invention thus provides a direct measurement of the thickness of the layer of lower density fluid and does not require the calculation of the remainder of the volume after subtracting the volume of contaminant or higher density liquid as would be the case if the location of interface 210 were directly measured. The nature and thickness of the sludge deposit can also be measured since the aperture 118' allows energy of the ultrasonic pulse to radiate thereto and detection of location and return of information concerning the nature of the sludge deposit is done in precisely the same manner in which return of water depth information and bottom quality (e.g. rocks, sand, mud, etc.) is done in the intended application of depth finder systems.

Figures 3, 4:
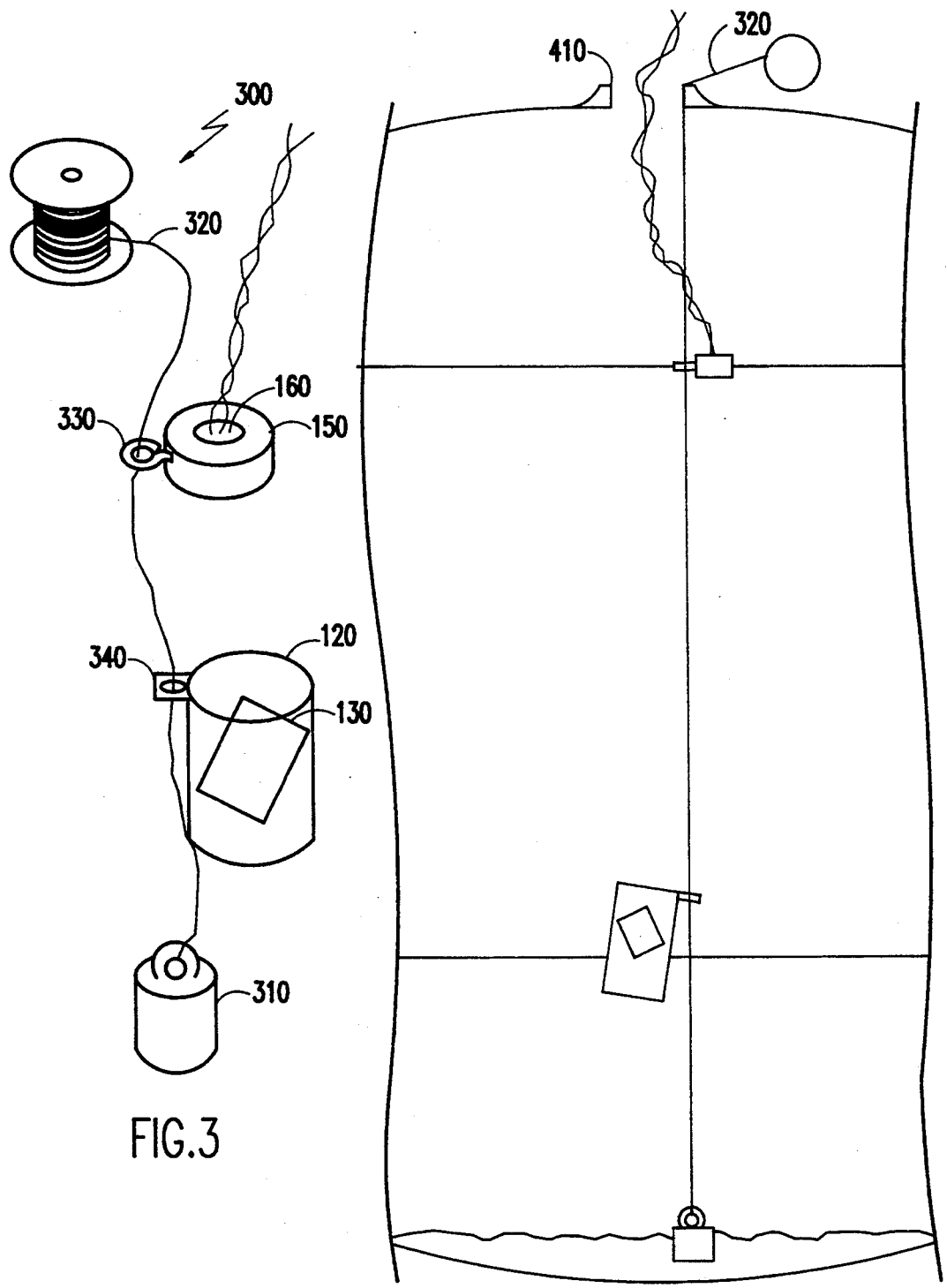
FIG. 3 is an isometric view of the elements of a portable embodiment of the invention.
FIG. 4 is a view of the embodiment of the invention shown in FIG. 3 when in use.

Referring now to FIG. 3, a portable form 300 of the invention, suitable for temporary placement in tanks is shown. In this embodiment of the invention, housing tube 110 is replaced by a flexible cord 320 which is preferably a plastic material such as 1000 pound test fishing line. Proper orientation of the cord within the tank is simply achieved with a sinker weight 310 of any convenient form. Adequate confinement of the transducer assembly 150, 160 and the float 120 is readily achieve through the use of a screw eye 330, shown for example, in connection with buoyancy device 150, or an apertured tab 340, shown, for example, in connection with container 120, or other arrangements which allow these parts to slide freely along line 320. Transducer assembly 150, 160 and float assembly 120, 130 remain otherwise unmodified from the embodiment of FIG. 1.

In use, as depicted in FIG. 4, slight tension on line 320 will achieve adequate alignment of the transducer 160 and float 120 since the ultrasonic energy is radiated downwardly over the volume of a cone having an angular extent of preferably about 10° to 20°. For installation and removal of this embodiment of the invention from the tank, the flexibility of the line allows use of this embodiment of the invention even where very small clearances are provided adjacent to opening 410. Additionally, the absence of the housing tube 110 allows the embodiment of FIG. 3 to be inserted through smaller openings in the tank since neither the thickness of the housing tube wall nor the clearance around the float 120 and/or transducer assembly 150, 160 need be accommodated.

The function of the embodiments of FIGS. 1 and 3 are identical except that no reduction of fluid motion in the tank in the vicinity of the float or transducer assembly is provided with the embodiment of FIG. 3. Nevertheless, the rapid reporting and the graphical display allows visual estimation of fluid motion to compensate for wavelike changes in separation of the transducer 160 and float 120. It is to be understood, however, that embodiments having some of the features of both of the embodiments described above also come within the scope of the invention. For example, Housing tube 110 could be formed from a flexible material which could be bent to accommodate close clearances near tank openings while retaining the baffle effect of reducing fluid motion provided in the embodiment of FIG. 1. In such a case, some structure, such as a spiral spring should be provided on the interior or exterior of the flexible tube to restore the straightness and cross-section of the flexible tube after it is bent for insertion into the tank.

In view of the foregoing, it is evident that the invention provides a simple and reliable fluid measurement system and method which can simultaneously monitor and display a liquid level and the location of at least two interfaces between different materials as well as supplying information concerning the nature of settled solid material such as sludge. The invention provides for use in tanks where only small clearances and small tank openings are available for access and which is relatively unaffected of readily compensated for fluid motion within the tank.

While the invention has been described in terms of a single preferred embodiment, those skilled in the art will recognize that the invention can be practiced with modification within the spirit and scope of the appended claims.

Having thus described my invention, what is claimed as new and desired to be secured by Letters Patent is as follows:

1. A sensor for use in determining the level of contents of a tank or other container including
    a transducer means for radiating energy along an axis of said transducer in a substantially vertical direction through said contents of said tank or other container,
    buoyant means, attached to said transducer, for positioning said transducer at a gas-liquid interface, and
    float means having a density intermediate between the densities of two immiscible liquids which may be contained by said tank or container, said float means including means for reflecting said ultrasonic energy, and
    means for restraining said float means in approximate alignment with said axis of said transducer.

2. A sensor as recited in claim 1, wherein said means for restraining said float means is a flexible cord.

3. A sensor as recited in claim 1, wherein said means for restraining said float means is a partially closed tube.

4. A sensor as recited in claim 3, wherein said partially closed tube is flexible.

5. A sensor as recited in claim 3, wherein said partially closed tube includes baffle means.

6. A sensor as recited in claim 5 wherein said baffle means includes a slit in said partially closed tube.

7. A sensor as recited in claim 1 wherein said transducer means includes an ultrasonic transducer.

8. A sensor as in claim 1 wherein the said float means is filled with one of said two immiscible liquids.

9. A method for determining the level of contents of a tank or other container, said method including the steps of:

buoyantly supporting an energy radiating and receiving transducer means at a gas-liquid interface and in a predetermined orientation such that an axis of energy radiation of said transducer means is substantially vertical;

restraining an energy reflective float near said axis of energy radiation;

filling said float with liquid sampled from said tank and;

displaying a graphic image derived from energy reflected by said float and indicative of the level of at least one other material contained in said tank or other container.

* * * * *